United States Patent [19]

Mizuyoshi et al.

[11] 4,079,882
[45] Mar. 21, 1978

[54] VIBRATION-ISOLATING APPARATUS FOR A CENTRIFUGE

[75] Inventors: Ryutaro Mizuyoshi, Tokyo; Minoru Hara, Asaka, both of Japan

[73] Assignee: Kabushiki Kaisha Kubota Seisakusho, Tokyo, Japan

[21] Appl. No.: 779,232

[22] Filed: Mar. 18, 1977

[51] Int. Cl.² .............................................. B04B 9/02
[52] U.S. Cl. .................................... 233/24; 233/1 C; 248/21; 267/71
[58] Field of Search ...................... 233/24, 1 C; 248/9, 248/15, 18, 21; 267/180, 166, 61–71, 148; 68/23.1, 23.3

[56] References Cited

U.S. PATENT DOCUMENTS

| 707,388 | 8/1902 | Chaffin | 267/71 |
|---|---|---|---|
| 3,195,809 | 7/1965 | Pickels et al. | 233/1 C |
| 3,509,742 | 5/1970 | Bauer | 248/21 |
| 3,804,324 | 4/1974 | Sinn | 233/1 C |

Primary Examiner—George H. Krizmanich
Attorney, Agent, or Firm—Haseltine, Lake & Waters

[57] ABSTRACT

A vibration-isolating apparatus for a centrifuge comprising a rotor mounted by means of at least one coil spring in a casing, wherein to dampen vibrations, a flexible belt is wound longitudinally on the coil spring around both ends thereof in a plurality of turns. The belt can be clamped to the ends of the coil spring.

7 Claims, 5 Drawing Figures

VIBRATION-ISOLATING APPARATUS FOR A CENTRIFUGE

FIELD OF THE INVENTION

This invention relates to a vibration-isolating apparatus for a centrifuge for performing sedimentation, separation, dehydration or the like by utilization of a centrifugal force.

BACKGROUND

In conventional centrifuges, containers for a sample are carried by a rotor and the rotor is driven in rotation at high speed by an electric motor to produce high centrifugal force. The rotary mechanism including the rotor and the motor is conventionally supported on a stationary casing by at least one coil spring in order to obtain stable high speed rotation without transmission of vibration. The centrifuge with this rotary system has a mechanical natural frequency, that is, a resonance point, and it is conventional, for obtaining stable high speed rotation, to rotate the rotor at a speed which is much higher than the natural frequency. Accordingly, in using the centrifuge, it is unavoidable for the rotor to pass through the natural frequency, that is, the resonance point during running up to speed and during slowdown when stopping. If the rotary body has an unbalanced weight condition, there is caused the danger that at the moment when the rotary body passes through the resonance point, the rotor is substantially vibrated and the sample-containing containers carried by the rotor fly off or the sample placed in the centrifuge is disordered, so that operation of the centrifuge becomes unprofitable. Accordingly, it has been conventional to balance the rotor and the sample containers, and additionally, the amount of the sample to be introduced in the containers is weighed each time when it is put into each container in order to obtain proper balancing. Thus, use of the centrifuge becomes troublesome.

SUMMARY OF THE INVENTION

An object of this invention is to provide a vibration-isolating apparatus for a centrifuge in which even if the rotary body is in an unbalanced condition, in weight, it will not generate large vibration at the resonance point and hence the rotary body can pass through the resonance point in safety.

A feature of such centrifuge is that there is no requirement for introduction of precise measures of the sample into the containers and the sample can be introduced into the containers by eye measure whereby operation of the centrifuge is simplified.

According to this invention, the rotary body of the centrifuge, including a rotor and an electric motor for driving the rotor is supported from a casing by at least one coil spring, and a flexible belt is wound longitudinally on the coil spring around both ends thereof. Thereby, transmission of vibrations is prevented by the coil spring, and any vibrations generated are rapidly damped due to bending of the wound belt and additionally, due to friction between layers of the belt. Consequently, the centrifuge can be operated stably without generating large vibration.

DETAILED DESCRIPTION

Figure 1:
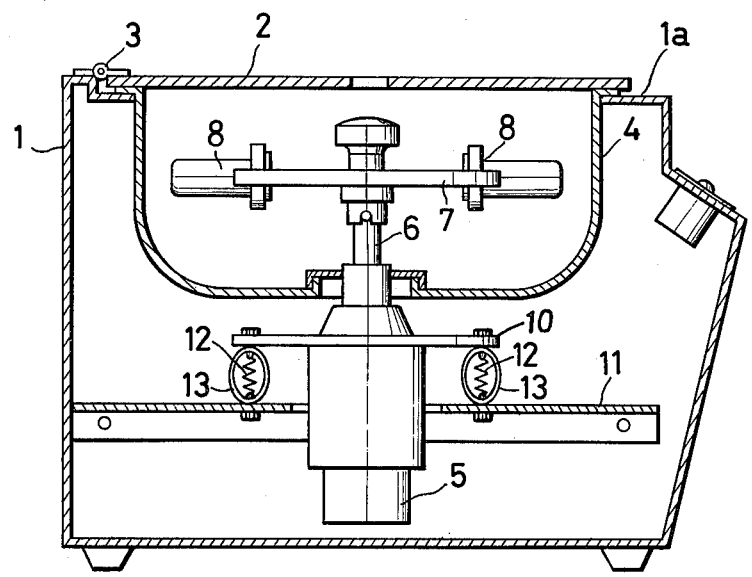
FIG. 1 is a side view, partly in section, of one embodiment according to this invention.

Referring to FIG. 1, numeral 1 denotes an outer casing of a centrifuge having a top wall 1a with a large opening therein and a covering plate 2 is attached to the upper wall so as to be pivotable about a hinge 3. An inner housing 4 is attached to the top wall 1a within outer casing 1 so that its open top faces the covering plate 2. An electric motor 5 is disposed between a bottom wall of the inner housing 4 and a bottom wall of the outer casing 1. A rotary shaft 6 of the motor 5 extends into the inner housing 4 through a central opening provided in the bottom wall of the inner housing 4. A rotor 7 is attached to the rotary shaft 6 and containers 8 for a sample are detachably mounted on carriers of the rotor 7. A plurality of coil springs 12 are interposed between a flange 10 integral with a bracket of the motor 5 and a stationary supporting plate 11 attached to an inner side wall of the outer casing 1 so that the motor 5 is resiliently supported by the coil springs 12.

Figure 2:
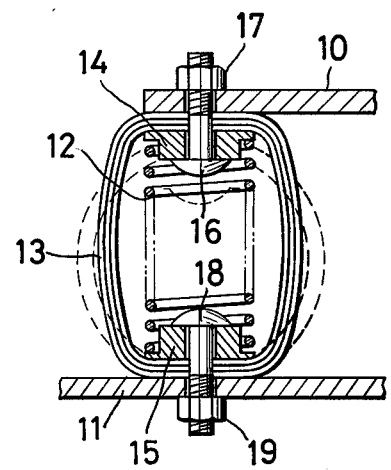
FIG. 2 is an enlarged sectional side view of a portion thereof.
Figure 5:
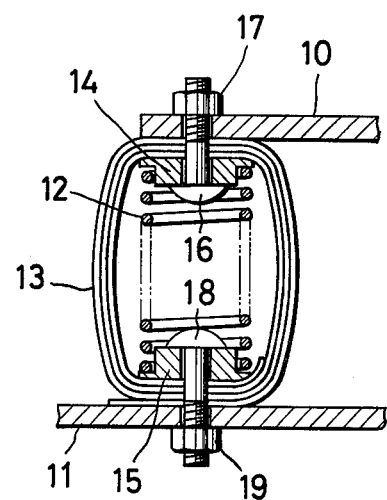
FIG. 5 is a view similar to FIG. 2 showing a modification thereof.

According to the invention, each of the coil springs 12 is provided with a flexible belt 13 which is wound longitudinally thereon so as to pass across and over both end surfaces thereof. It is preferable, in this case, that the belt 13 be wound thereon concentrically as shown in FIG. 2 or spirally as shown in FIG. 5 so as to form a plurality of layers thereof. As shown clearly on enlarged scale in FIGS. 2 and 5, the opposite open end surfaces of the coil springs 12 are closed by respective seat plates 14, 15, and the belt 13 is wound thereon as a plurality of looped layers so as to pass over and across the outer surfaces of the seat plates 14, 15. That portion of the belt 13 corresponding to one end of the coil springs 12 is in abutment at its outer surface with one side surface of the flange 10 of the motor 5, and that portion of the belt 13 corresponding to the other end of the coil springs 12 is in abutment with the stationary supporting plate 11. In this condition, the flange 10, the belt 13 and the seat plate 14 are clamped together by means of a bolt 16 inserted through openings provided in the seat plate 14, the belt 13 and the flange 10, respectively, and a nut 17 on the bolt 16. Similarly, the seat plate 15, the belt 13 and the stationary supporting plate 11 are clamped together by means of a bolt 18 and a nut 19. The belt 13 may be made, for instance, of natural leather or synthetic resin, and it preferably is made of synthetic resin having a comparatively rough cloth affixed thereto at one surface, or a flexible material, such as rubber or the like, which has a comparatively high frictional coefficient at least at one side surface.

Figure 3:
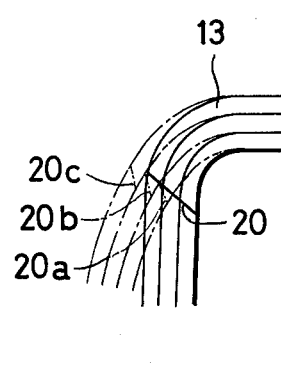
FIG. 3 is a diagrammatic illustration explaining the operation thereof.

In the centrifuge constructed as above, if the rotor 7 is rotated by motor 5 and increases in rotation speed, vibrations are generated when it passes through the resonance point and the wound belt 13 is bent and stretched repeatedly, so that energy is consumed and the generated vibrations are damped. When the belt 13 is wound in the form of a plurality of layers, the adjacent layers are shifted or displaced relative to one another while rubbing against one another. As shown in FIG. 3, for instance, if the wound belt 13 is deformed by the vibrations as shown in dotted lines, a line 20 drawn on one side edge surface thereof before deformation does not remain straight in the deformed condition but becomes three separated lines 20a, 20b, 20c by the shifting action between the layers. Thus, mutual displacements are brought about between the layers of the belt 13 and such displacements are repeatedly generated, this repeated mutual displacement or sliding between the layers being effected against the large frictional force between the belt layers, whereby the generated vibrations are damped thereby. Thus, even if vibrations are generated, they are prevented from increasing and the centrifuge can pass through the resonance point immediately. Accordingly, even if the rotary body including the rotor 7 is more or less unbalanced in weight, no large vibrations are generated. It has been found that, when the belt 13 is a synthetic resin belt one surface of which has a cloth layer thereon and the belt is wound with five turns, even if the rotary body is fairly unbalanced in weight, it can pass through the resonance point without creating large vibration and can be operated stably.

Figure 4:
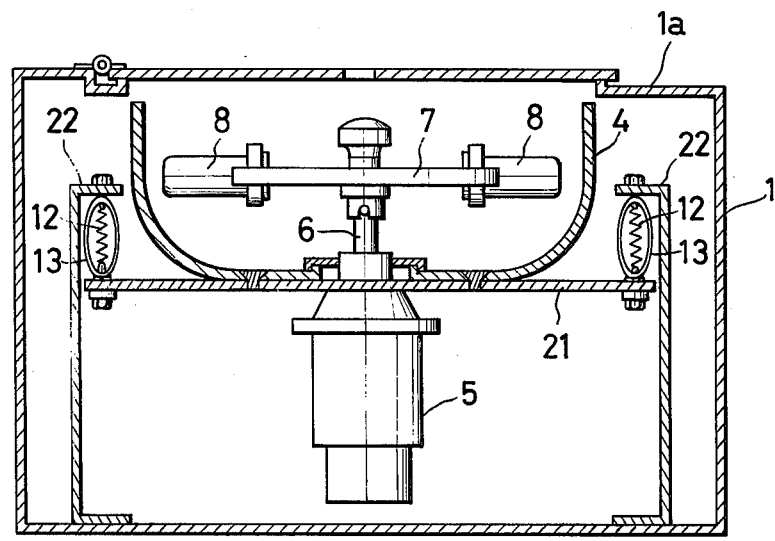
FIG. 4 is a side view, partly in section, of another embodiment according to this invention.

As regards the means for supporting the motor 5, various modifications may be adopted. In one modification as shown in FIG. 4, the motor 5 is attached to the inner housing 4 and a supporting plate 21 is attached to the bottom wall of the inner housing 4, and the supporting plate 21 is attached to a stationary bracket 22 in the outer casing 1 through the coil springs 12. This construction is of the type in which the supporting plate 21 is suspended via the coil springs 12, and in this arrangements vibrations can be damped in almost the same manner as above by the instruction in which the coil spring 12 has the flexible belt 13 wound longitudinally thereon.

According to the invention, as described above, it is possible to damp generated vibrations simply by the arrangement in which the coil spring 12 which is conventionally used for resiliently supporting the rotary body, is wound with the flexible belt 13 thereon in the longitudinal direction thereof. Thus, the construction is very simple and any generated vibrations can be well damped, so that the rotor 7 need not require the conventional careful balancing. The design and manufacture of the rotor thereby becomes simpler and the reduced requirements are applicable also to the manufacture of the containers 8 and the mounting portions thereof. Additionally, the sample to be put into each of the containers 8 need not be precisely weighed in a weighing measurement one by one and the sample for each container can be introduced thereinto by eye measure. Accordingly, the centrifuge is greatly facilitated in operational handling. Additionally, there is no danger that the containers mounted on the centrifuge can fly off due to vibration and splatter the sample.

Although the invention has been described in relation to preferred embodiments thereof, it will become apparent to those skilled in the art that numerous modifications and variations can be made without departing from the scope and spirit of the invention as defined in the attached claims.

What is claimed is:

1. A vibration-isolating apparatus for a centrifuge having a casing, a rotary body including a rotor and an electric motor for driving the rotor, and at least one coil spring dampingly supporting the rotary body in the casing, the improvement comprising a flexible belt wound longitudinally on the coil spring and around both ends thereof, said flexible belt being wound in a plurality of layers.

2. An apparatus as claimed in claim 1 wherein the layers are aligned on one another.

3. An apparatus as claimed in claim 1 wherein the layers are spirally wound.

4. An apparatus as claimed in claim 1 wherein said belt has at least one outer surface with a relatively high coefficient of friction for frictional contact between said layers.

5. An apparatus as claimed in claim 1 comprising seat members at the ends of the coil spring, said belt being wound on the outer surface of the seat members.

6. An apparatus as claimed in claim 5 comprising means clamping the belt against said seat members.

7. An apparatus as claimed in claim 1 wherein said layers of said belt extend across and over both end surfaces of said spring to completely surround the spring.

* * * * *